April 10, 1934.  V. M. WARD  1,954,158
FLUID PRESSURE BRAKE
Filed Dec. 25, 1930   3 Sheets-Sheet 3
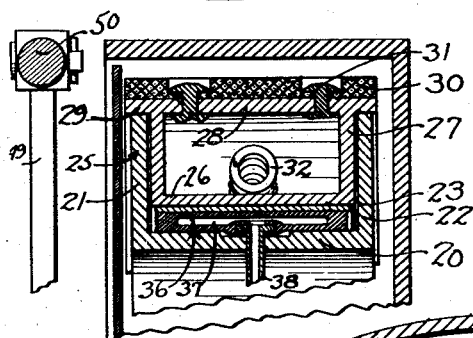
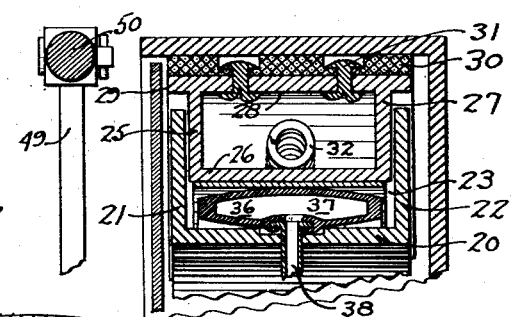
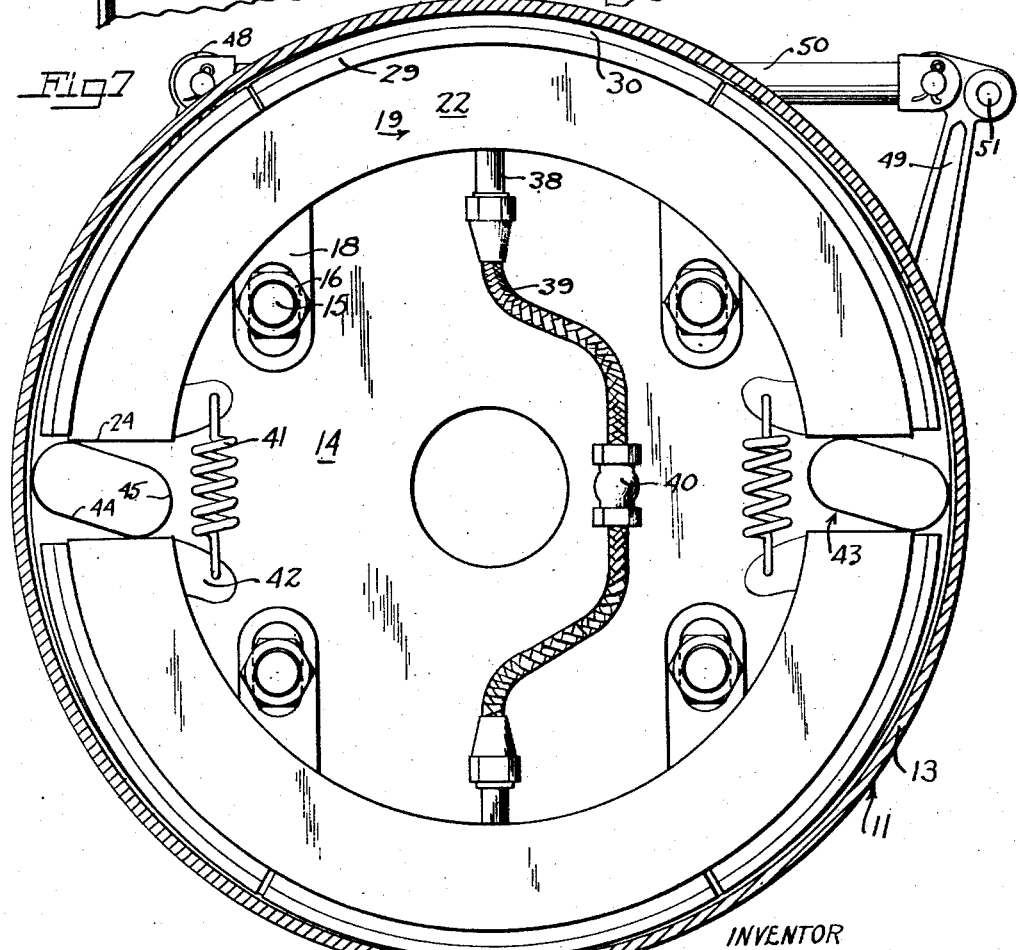
INVENTOR
Verne M. Ward
By Hazard and Miller
Attorneys Patented Apr. 10, 1934

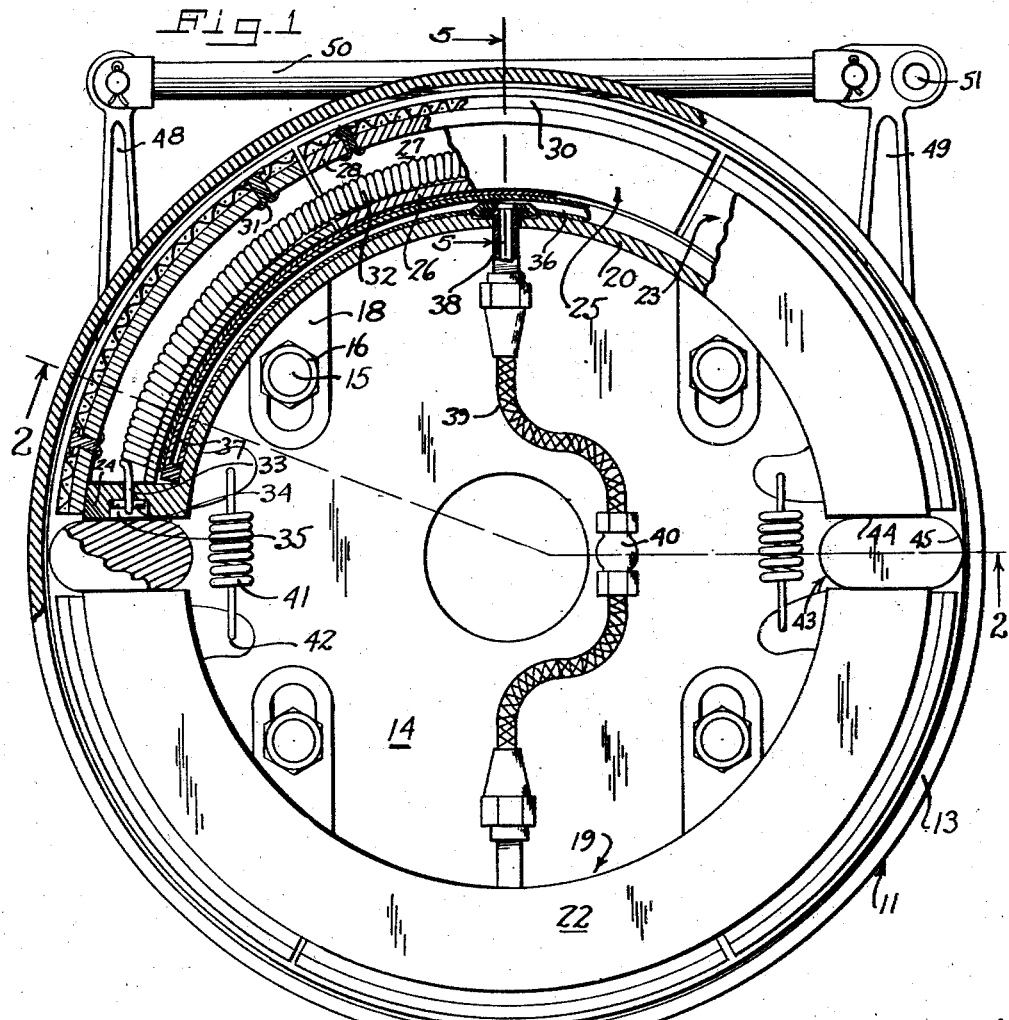
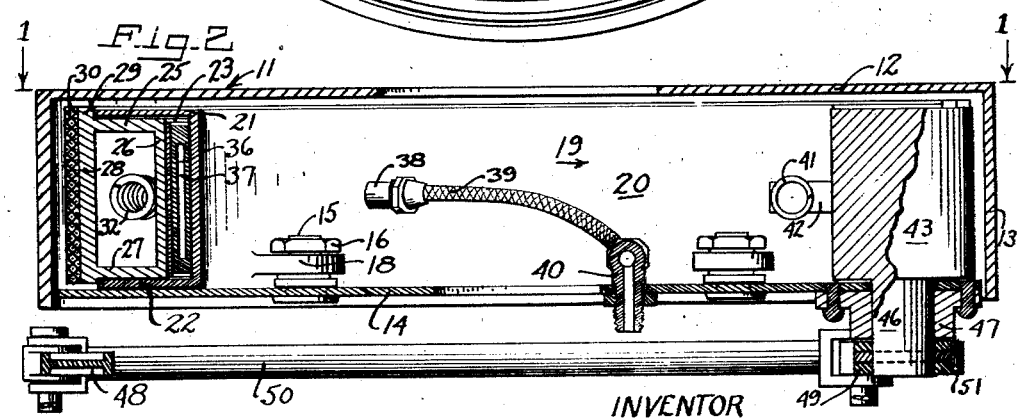

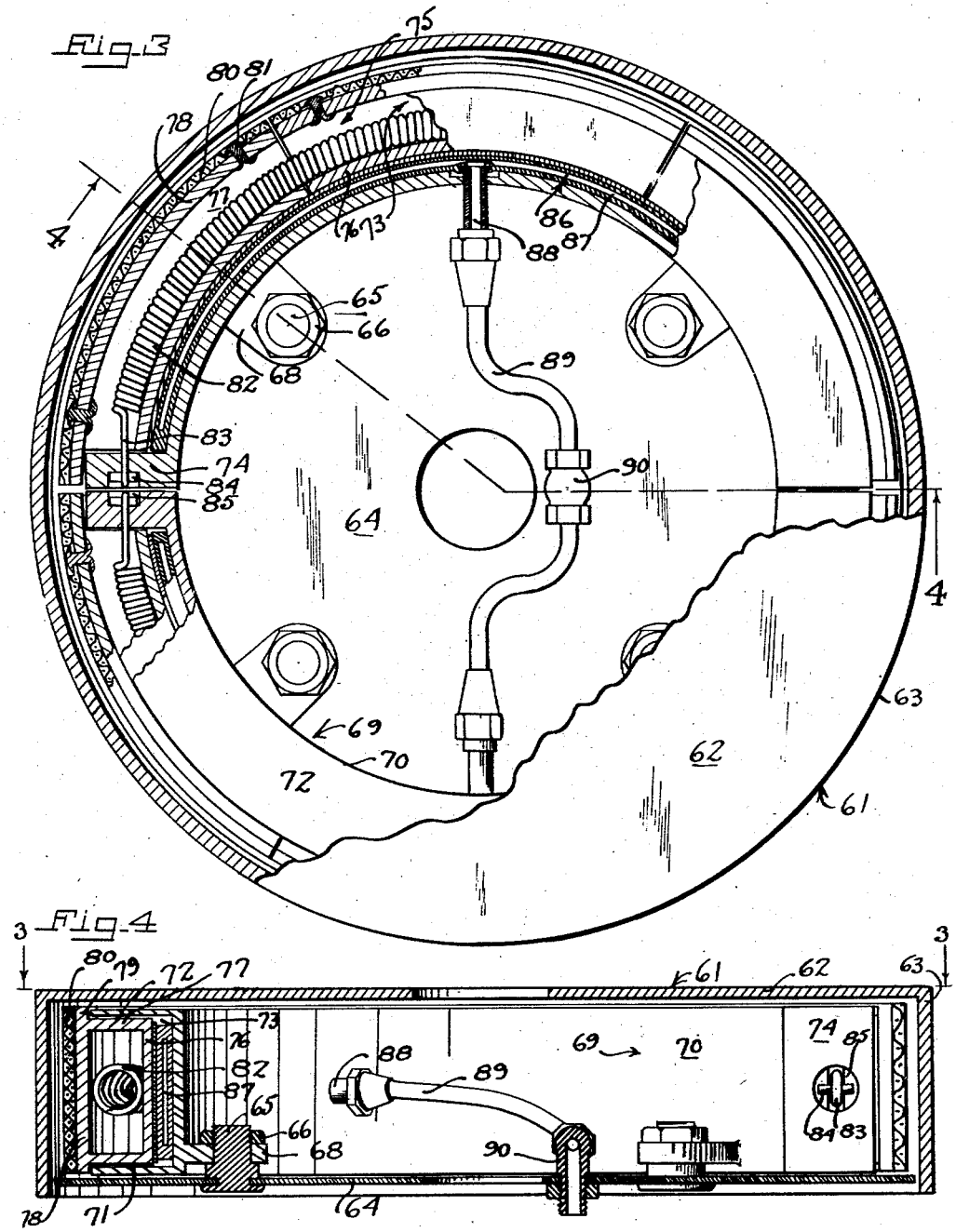

1,954,158

UNITED STATES PATENT OFFICE 1,954,158

FLUID PRESSURE BRAKE

Verne M. Ward, Cornell, Calif.

Application December 25, 1930, Serial No. 504,668

8 Claims. (Cl. 188—152)

My invention relates to fluid pressure brakes adapted particularly for motor vehicles and in which the brakes are of the internal expanding type.

An object of my invention is to provide internal brakes for motor vehicles in which the direct action of air under pressure or of a hydraulic fluid forces the movable segments of the brake outwardly to press the brake lining against the inside of the brake drums and thus effect the braking action on the vehicle.

A further object and feature of my invention in this connection is providing an air or a hydraulic fluid chamber which, in expanding, directly forces the movable segments of the brake outwardly.

A still further object and feature of my invention is making the chamber for the air or expansive fluid elongated and conforming to the internal shape of the brake segments, making this, preferably, in the form of a substantial semicircle, so that on the expansion of the air or expansion of the chamber due to the hydraulic fluid the segments may be forced outwardly substantially radially.

Another object and feature of my invention is the manner of mounting the various movable segments of the brake and securing the retraction of such segments; and in this connection a feature of my invention is the employment of a channel shaped housing having, preferably, a semicircular base or inside surface, the movable segments conforming to this surface and being spaced therefrom by the air or hydraulic expansible chamber. A common tension spring extends through all of the segments and tends to maintain these in a retracted position with the lining out of contact with the brake drum whereby on expansion of the air or hydraulic chamber the segments are forced outwardly.

A further object and feature of my invention in detailed construction involves making the air or hydraulic chamber in the form of a flat, resilient tube, such as a flat rubber tube, this being curved longitudinally to follow the semicircular base of the housing.

Another object and feature of my invention is an emergency or service brake connection whereby the brakes may be applied without the air or hydraulic fluid actuation, such being particularly adapted for rear wheel brakes for use in parking or the like. In this connection, an object and feature of my invention is, by a mechanical arrangement, pressing apart or expanding the housing containing the brake segments whereby these housings, when forced outwardly, bring the brake lining into contact with the drum of the wheel.

My invention in its various aspects is illustrated in connection with the accompanying drawings, in which:

Fig. 1 is a side elevation showing part of a brake drum and my invention in elevation, with certain parts broken away to show the interior construction, illustrating a type performing an emergency or auxiliary brake;

Fig. 2 is a section on the line 2—2 of Fig. 1 in the direction of the arrows;

Fig. 3 is a view similar to Fig. 1 of a modified construction suitable for front wheel brakes, and taken in the direction of the arrow 3 of Fig. 4;

Fig. 4 is a section on the line 4—4 of Fig. 3 in the direction of the arrows;

Fig. 5 is a transverse section on the line 5—5 of Fig. 1 in the direction of the arrows with the brake segments contracted;

Fig. 6 is a view similar to Fig. 5 with the brake segments expanded for applying the brakes;

Fig. 7 is a view similar to Fig. 1, omitting the sections and expanded mechanically by the emergency or auxiliary brake applying devices.

Referring first to the construction of Figs. 1, 2, and 7; these illustrate a brake drum designated generally by the numeral 11, in which there is a disk 12 with a cylindrical drum or flange 13. This drum may be attached to the wheel of the vehicle in any of the ordinary or known manners. As my invention does not feature anything novel in the form of the drum itself this is not illustrated in complete detail nor fully described.

My invention contemplates providing a holding or supporting disk 14 which may be attached to a fixed part of the vehicle, and such disks for mounting the brake mechanism are made in different manners to be accommodated in different automobiles. The manufacturers applying these to their vehicles drill the holes for the supporting bolts at the desired places. Hence, the disk may be modified widely for different automobiles. The disk is provided with a series of studs 15, these being indicated as having nuts 16 thereon and slidably mounted on the studs are lugs 18. These lugs support and form the mounting for the brake housing designated generally as 19. This housing as illustrated particularly in Figs. 5 and 6, has an inner or base portion 20 formed as a semicircle and two outwardly extending flanges 21 and 22, thus forming an internal trough 23. These are made substantially semicircular and have end closures 24. These housings are, therefore, solid structures. In these housings there are accommodated a plurality of movable segments designated generally at 25, these segments being illustrated as box like in cross section, having a curved base 26, two side walls 27, and an outer peripheral face 28, such face having an extension 29 over the edge of the flanges 22 (note Figs. 5 and 6). For each housing, three segments are illustrated and each segment has a brake lining 30 secured thereto by rivets 31 in the usual manner. The segments are held in place snugly in the housing by a tension spring 32, which extends from one of the ends 24 of the housing to the other end, these springs being illustrated as having an end 33 of the wire extending through a perforation in the end 24 of the housing and having an eye engaging a pin 34, such pin fitting in a recess 35 in the end 24. Thus these movable segments are drawn in toward the center with the lining normally withdrawn from the inside face of the brake drum.

The expansible chamber designated generally 36 for holding the air or hydraulic fluid is made of flexible, resilient material and, preferably, rubber, being in the form of a tube closed at both ends and having an interior space 37. This is connected by a nipple 38 extending through the base wall 20 of the housing for the brake segments and by means of flexible hose 39 and a second nipple 40 may be connected to a source of air or liquid under pressure. It will, therefore, be seen that when compressed air or a hydraulic fluid under pressure is forced through the nipple 40, the hose 39, and nipple 38, into the hollow chamber 37, that the expansible device spreads in a cross sectional direction as illustrated by the difference in Figs. 5 and 6. The outward pressure, therefore, forces the segments 25 outwardly and presses the brake lining into contact with the brake drum, thereby causing the application of a braking resistance to the rotation of the wheels.

A feature of my invention is that the expansion of the expansible chamber forces the segments carrying the brake lining outwardly substantially radially. Thus an equal pressure is brought by each of the segments against the brake drum. These segments are prevented from creeping around the housings by the end contact with the housing troughs and one with the other. On release of the air or hydraulic pressure in the expansible chambers, the housing sections 25 are drawn inwardly by means of the contraction springs 32 which are secured to the ends 24. The side walls 27 of the end segments engage with the ends 24 of the supporting troughs and limit the circumferential movement of these, hence, the intermediate segments can only move the space between any two segments when they are expanded. Manifestly, these segments must be designed so that in their contracted position they will have a close end to end fit, but when they expand outwardly radially this joint between two adjacent segments increases.

In order to obtain a mechanical application of the brakes above described, as, for instance, to use them as emergency or parking brakes, I employ a pair of cams 43. (Note Figs. 1, 2, and 7.) These cams are illustrated as having flat sides 44 and rounded ends 45. Each cam is mounted on a stub shaft 46, such shafts being journaled in the journal box 47 secured to the supporting disk 14. Rock arms 48 and 49 are connected to each of these shafts and the two rock shafts connected by a link 50. The rock shaft 49 is indicated as having an eye 51 which may be attached to a link or a cable connected to the manual braking devices of the vehicle and operable by the emergency or parking brake lever. It will be seen that on operation of these rock shafts by a pull exerted on the eye 51 that the shafts are rocked from the position of Fig. 1 to that of Fig. 7. This causes a rotation of the cams and brings an end pressure to bear on the end closures 24 of the housings 19, this forcing the two housings apart, as illustrated in Fig. 7, causing the segments carrying the lining to have such lining forced against the inside of the brake drum. Manifestly, the center segments in each of the housings receives the greatest pressure, as these two housings move bodily, but the end segments, also, when the brake is fully applied, give a pressure on the brake lining and this is more or less equalized due to the fact that the air or hydraulic fluid expansive chambers are formed of a rubber tube which may distort under pressure to a certain extent. This construction is more suitable for a rear brake construction.

A front brake construction, illustrated particularly in Figs. 3 and 4, employs a brake drum designated generally at 61, this having a disk 62 and a drum or flange 63. There is a supporting disk 64, which disk is provided with a series of studs 65, these having nuts 66 thereon, and fixed to these studs are lugs 68, which lugs are attached to the brake housings 69. These housings have a base portion 70 formed of a semicircle and having two outwardly extending flanges 71 and 72 forming an internal space 73. These have end closures 74. In these housings there are accommodated a plurality of segments designated generally at 75 which are boxlike in cross section, having a curved base 76, two side walls 77, and a peripheral face 78, this face having an extension 79 over the edge. Each section has a brake lining 80 secured thereto by rivets 81. A tension spring 82 extends between the ends 74 of the housings, these springs having an end 83 with an eye secured by a pin 84 in a recess 85 in each of the end walls 74.

The expansible chamber 86 has an interior space 87. This is connected by a nipple 88 with a hose 89 which may be more or less rigid, and this to a second nipple 90, which latter nipple may be connected to a source of compressed air or liquid under pressure.

When the compressed air or hydraulic fluid is forced into the resilient expansible chambers, these chambers are enlarged in cross section and, necessarily, force the segments having the brake lining outwardly, each segment being forced in a radial direction. On account of the housings being rigidly secured to the supporting disks, a pressure is exerted against the interior of the brake drum, thus securing the braking action of the wheel. So far as the air or hydraulic action is concerned the action is the same as in connection with Figs. 1 and 2, because in such latter figures the movement of the semicircular housings is to provide for the mechanical applying of the brakes but in the illustrations of Figs. 3 and 4 the mechanical brake application is omitted. It will be therefore seen that a vehicle may be equipped with my type of brakes having the fixed housings for the front brakes and that the service application of the brakes on all four wheels may be made by compressed air or by hydraulic fluid under pressure, then, if, for any reason, additional braking action is required, the emergency brake may be used, applying mechanical braking on the rear wheels. This, however, is, in reality, only intended for parking or the like, as, usually, sufficient braking power may be obtained with the compressed air or with the hydraulic fluid.

Various changes may be made in the details of construction without departing from the spirit or scope of the invention as defined by the appended claims.

I claim:

1. A brake having a brake drum, a supporting disk having a housing connected thereto, said housing having a base concentric to the drum and on the inside, a series of radially movable segments in the housing mounted to permit slight relative circumferential movements, each having brake lining, an expansible tube between the base of the housing and the segments, a connection from said tube to an expanding fluid, means to retract the said segments, the expanding of the tube under the action of the fluid forcing the segments outwardly radially to contact the lining with the drum, the series of segments having an open center disposed circumferentially and a retraction spring passing through the open center of a plurality of said segments, said spring being secured to the housing and adapted to retract the segments on deflation of the tube.

2. A brake having a brake drum, a supporting structure having a plurality of circumferentially hollow movable segments therein, each segment having a brake lining, a single retraction spring extending through each segment circumferentially and secured to the housing at each end of the spring, a resilient expansible tube forming an expanding chamber adapted for expansion by air or liquid, the said tube being inserted between the housing and the segments and adapted to force said segments outwardly radially on inflation of the said tube.

3. A brake having a brake drum, a supporting structure having a base concentric therewith and on the interior of the drum, a resilient tube on the outside of said base considered radially, a plurality of radially movable segments between the tube and the drum, each having a brake lining, the tube being adapted for inflation by air or a liquid and when inflated forcing the segments outwardly to contact the lining with the drum, said segments being hollow in a circumferential direction, and a single retraction spring extending circumferentially through said hollow segments, the ends of the said spring being secured to the said supporting structure.

4. A brake having a brake drum, a pair of trough-shaped substantially semi-circular housings, each with a base concentric with the drum, a resilient expansible tube in each housing resting on the base, a plurality of hollow movable segments in each trough, each having a base bearing upon the expansible tube and having a peripheral face with a lining to bear on the drum, a spring secured to the opposite ends of each trough and extending through the hollow segments forming means to retract said segments.

5. A brake having a brake drum, a fixed disk having a pair of substantially semi-circular trough-shaped housings, each with a base concentric with the drum and having closure ends, a single expansible tube in each housing resting on the base and extending from end to end, a plurality of hollow segments, each having a base, opposite side walls, and a peripheral face, the peripheral face having a brake lining secured thereto, the end segments being adapted to bear against the ends of the housing, and a spring attached to the two ends of each housing and extending through the hollow segments in a housing, and forming a single retraction means for all of the segments in a housing.

6. A brake as claimed in claim 5, a pair of cams positioned between the ends of the two supporting housings, and means to operate said cams to force the supporting housings outwardly at right angles to a plane through the ends of said housings.

7. A brake having a brake drum, a fixed disk having a pair of substantially semi-circular trough-shaped housings, each having a base concentric with the drum, opposite side walls, and closure ends, said closure ends being substantially radial, a single expansible tube extending from end to end of each housing and bearing on the base, with means to expand such tube, a plurality of arcuate hollow segments, each having a base, side walls, and a peripheral face, the peripheral face having a brake lining, and the base bearing on the outside portion of the expansible tube, the side walls of the segment fitting adjacent the side walls of the housing, the peripheral face extending laterally over the side walls of the housing and at the end segments extending over the ends of the housing, a single spring having its opposite ends secured in the ends of each housing and extending through the hollow segments, each spring forming a single means for retracting each of the segments on deflation of said tube.

8. A brake as claimed in claim 7, each of the housings having a slidable mounting on the fixed disk to permit sliding at right angles to the ends of each housing, and a cam positioned between the ends of each housing, with means to rotate the cam to force the segments in each housing outwardly when retracted in the housing.

VERNE M. WARD.